(12) United States Patent
Isaka

(10) Patent No.: US 8,505,011 B2
(45) Date of Patent: Aug. 6, 2013

(54) METHOD OF OPTIMIZING JOB DISTRIBUTION PROCESS BY ANALYSIS OF TRANSMISSION TIME AND PROCESSING TIME

(75) Inventor: Youichi Isaka, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 246 days.

(21) Appl. No.: 13/149,028

(22) Filed: May 31, 2011

(65) Prior Publication Data

US 2012/0084781 A1    Apr. 5, 2012

(30) Foreign Application Priority Data

Oct. 1, 2010    (JP) ................................ 2010-224223

(51) Int. Cl.
*G06F 9/46*    (2006.01)
(52) U.S. Cl.
USPC ............................. 718/100; 718/101; 718/102
(58) Field of Classification Search
USPC ......................................... 718/100, 101, 102
See application file for complete search history.

(56) References Cited

U.S. PATENT DOCUMENTS

| | | | | |
|---|---|---|---|---|
| 7,788,667 | B2* | 8/2010 | Jiang .............................. | 718/102 |
| 2006/0206900 | A1 | 9/2006 | Ooyama et al. | |
| 2007/0186214 | A1* | 8/2007 | Morgan ......................... | 718/100 |
| 2008/0021987 | A1* | 1/2008 | Bates et al. .................... | 709/223 |
| 2009/0063413 | A1* | 3/2009 | Lee et al. ........................... | 707/3 |
| 2010/0036641 | A1* | 2/2010 | Lee et al. ...................... | 702/186 |
| 2010/0205606 | A1* | 8/2010 | Panzer .......................... | 718/102 |
| 2011/0264593 | A1* | 10/2011 | Gaisford et al. .............. | 705/301 |

FOREIGN PATENT DOCUMENTS

| | | |
|---|---|---|
| JP | 2005-056201 A | 3/2005 |
| JP | 2005-352693 A | 12/2005 |
| JP | 2006-159741 A | 6/2006 |
| JP | 2006-252163 A | 9/2006 |

OTHER PUBLICATIONS

Benting Wan, "Scheduling Strategy of Subtask Decomposed", Mar. 2008, Advanced Information Networking and Applications—Workshops, 2008. AINAW 2008. 22nd International Conference. Conference Publications.*
Anton Cervin, "Integrated Control and Real-time Scheduling", Apr. 2003, Department of Automatic Contol, Lund Institute of Technology.*
Taewoong Kim et al., "Best Case Response Time Analysis for Improved Schedulability Analysis of Distributed Real-time Tasks", 2000, Seoul National University.*

* cited by examiner

*Primary Examiner* — Emerson Puente
*Assistant Examiner* — Steven Do
(74) *Attorney, Agent, or Firm* — Sughrue Mion, PLLC

(57) ABSTRACT

An information processing device includes an image forming device, an execution sub-job determining unit, a sub-job execution destination determining unit and an execution instructing unit. The image forming device is designated as a destination and executes at least a sub-job executed N-th as the last sub-job out of N sub-jobs in a case where a job is divided into N sub-jobs. The execution sub-job determining unit determines a sub-job other than the executed N-th sub-job within a range of the occupiable time of the image forming device in a case where there is an available capacity in the image forming device. The sub-job execution destination determining unit determines the execution destination of each sub job. The execution instructing unit instructs a calculation resource to execute the first to (i−1)-th sub-jobs and instructs the image forming device to execute the i-th to N-th sub-jobs.

7 Claims, 9 Drawing Sheets

FIG. 5

| CONTENT OF PROCESSING | INPUT COLOR | INPUT ENCODING | INPUT FILE SIZE (KB) | OUTPUT COLOR | OUTPUT ENCODING | OUTPUT FILE SIZE (KB) | ... |
|---|---|---|---|---|---|---|---|
| OFFSET ELIMINATION | BLACK AND WHITE | Raw | 1000 | BLACK AND WHITE | G4FAX | 100 | |
| OFFSET ELIMINATION | BLACK AND WHITE | G4FAX | 100 | BLACK AND WHITE | G5FAX | 100 | |
| OFFSET ELIMINATION | RGB | Raw | 100 | YCC | JPEG | 30 | |
| OFFSET ELIMINATION | RGB | Raw | 300 | YCC | JPEG | 100 | |
| OFFSET ELIMINATION | RGB | Raw | 1000 | YCC | JPEG | 290 | |
| OFFSET ELIMINATION | RGB | Raw | 3000 | YCC | JPEG | 850 | |
| OFFSET ELIMINATION | RGB | Raw | 10000 | YCC | JPEG | 2600 | |
| OFFSET ELIMINATION | YCC | JPEG | 100 | YCC | JPEG | 90 | |
| OFFSET ELIMINATION | YCC | JPEG | 300 | YCC | JPEG | 260 | |
| ... | | | | | | | |
| SKEW CORRECTION | YCC | JPEG | 100 | YCC | JPEG | 100 | |

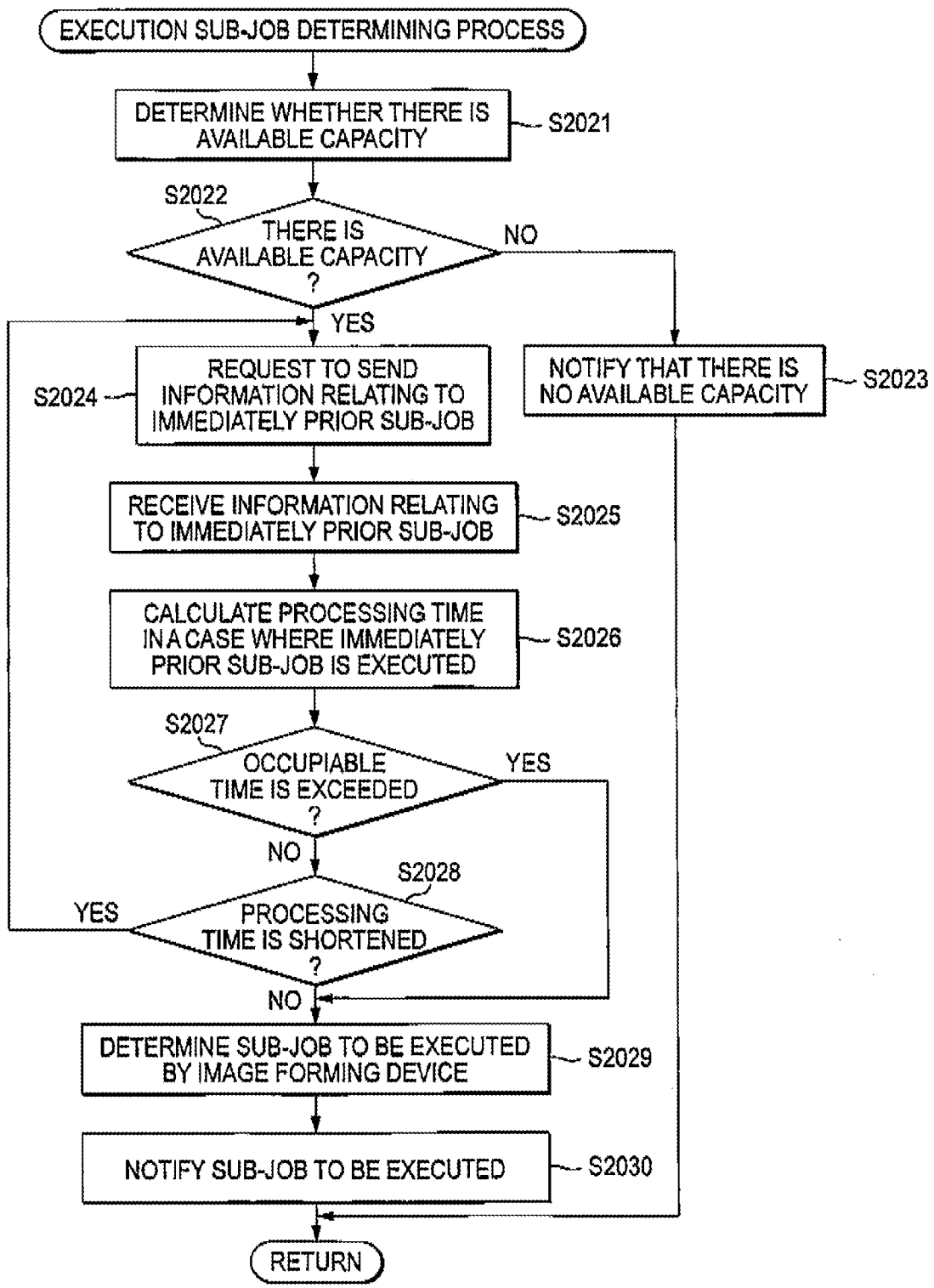

METHOD OF OPTIMIZING JOB DISTRIBUTION PROCESS BY ANALYSIS OF TRANSMISSION TIME AND PROCESSING TIME

CROSS-REFERENCE TO RELATED APPLICATION

This application is based on and claims priority under 35 USC 119 from Japanese Patent Application No. 2010-224223 filed on Oct. 1, 2010.

BACKGROUND

Technical Field

The present invention relates to a job distribution processing system, an information processing device and a computer-readable medium.

SUMMARY

[1]According to an aspect of the invention, a job distribution processing system includes an execution destination determining device, a job execution device and one or a plurality of sub-job replacement devices. The execution destination determining device accepts an executing request of a job, divides the accepted job into N sub-jobs, and determines an execution destination of each of the sub-jobs. N is an integer equal to or greater than three. The job execution device is designated as a destination of the job executing request and executes at least a sub-job which is executed N-th as the last sub-job out of the N sub-jobs. The one or the plurality of sub-job replacement devices execute a sub-job other than the sub-job executed by the job execution device instead of the job execution device. The execution destination determining device includes a first acquiring unit and a sub-job assigning unit. The first acquiring unit acquires replacement device capability information relating to a processing capability of each of the sub-job replacement devices. The sub-job assigning unit assigns the sub-jobs which are performed first to (N−1)-th to the sub-job replacement devices which are planned to execute the first to (N−1)-th sub-jobs by referring to the replacement device capability information. The job execution device includes a second acquiring unit, a third acquiring unit, a calculation unit and a specifying unit. The second acquiring unit acquires information relating to a current use status of the job execution device. The third acquiring unit acquires information relating to data transmission between the job execution device and the sub-job replacement device. The calculation unit calculates a first processing time and a second processing time, while sequentially decreasing a value of a variable i from N based on the replacement device capability information, the information relating to the current use status of the job execution device, and the information relating to data transmission, between the job execution device and the sub-job replacement devices. Here, i is a positive integer. The first processing time is calculated by adding a first execution time at a time when a (i−1)-th sub-job is executed by the sub-job replacement device assigned by the sub-job assigning unit and a first transmission time required for transmitting data of an execution result of the (i−1)-th sub-job from the sub-job replacement device to the job execution device. The second processing time is calculated by adding a second execution time at a time when the (i−1)-th sub-job is executed by the job execution device and a second transmission time required for transmitting data of an execution result at a time when a (i−2)-th sub-job is executed by the sub-job replacement device which is assigned by the sub-job assigning unit from the sub-job replacement device to the job execution device. The specifying unit specifies one variable i when the first processing time is shorter than the second processing time primarily in the case that a value of a variable i is sequentially decreased from N, as a result of comparing the first processing time with the second processing time which are calculated by the calculation unit. The execution determining device determines the sub-job replacement devices, which are assigned by the sub-job assigning unit, as the execution destinations of the first to (i−1)-th sub-jobs, and determines the job execution device as the execution destination of the i-th to N-th sub-jobs, in accordance with the one variable i specified by the specifying unit.

BRIEF DESCRIPTION OF THE DRAWINGS

Exemplary embodiments of the invention will be described in detail based on the following figures, wherein:

FIG. 5 is a diagram illustrating an example of file-size calculating data that is registered in a file-size calculating data storing unit according to this embodiment;

FIG. 8 is a flowchart illustrating an execution sub-job determining process illustrated in FIG. 7;

DETAILED DESCRIPTION

Hereinafter, a preferred embodiment of the invention will be described with reference to drawings.

Figure 1:
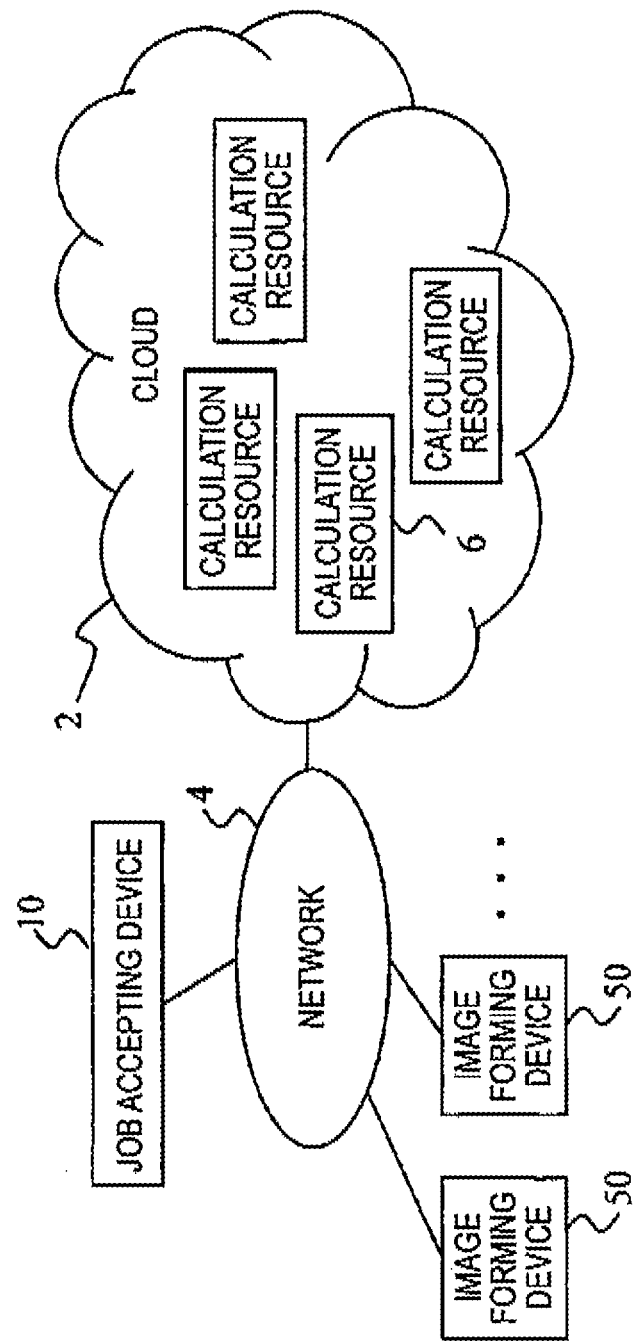
FIG. 1 is a diagram illustrating the entire configuration of a job distribution processing system according to an embodiment of the present invention.

FIG. 1 is a diagram illustrating the entire configuration of a job distribution processing system according to an embodiment of the present invention. In FIG. 1, a configuration is illustrated in which a job accepting device 10, image forming devices 50, and clouds 2 are interconnected through a network 4. The job accepting device 10 according to this embodiment is a device that is implemented by a computer such as a server, accepts a job execution request from a user, and instructs the image forming device 50 or the cloud 2 to execute the job. The image forming device 50 according to this embodiment is a device having multiple functions such as a scanner function and a printing function and executes a job accepted by the job accepting device 10 or a part thereof. In this embodiment, a job is divided into sub-jobs, and each sub-job is executed by the image forming device 50 or the cloud 2. However, in a case where the job is a print job, the image forming device 50 performs at least a printing process to be performed lastly out of processes to be performed through the job and outputs a printed material as a result of the execution of the job. The cloud 2 is an abbreviation of cloud computing and includes a plurality of calculation resources 6. Each of the calculation resources 6 is realized by a server computer or the like that performs a requested calculation process or the like. The job, originally, is executed by the image forming device 50 that is designated as an execution destination. However, from the viewpoint of shortening the processing time and the like, all or a part of sub-jobs other than the sub-job that is executed lastly out of sub-jobs that are formed by dividing the job is executed instead by the image forming device 50. Here, the job accepting device 10 may be integrally formed with a specific image forming device 50.

Although FIG. 1 illustrates one job accepting device 10 and a plurality of the image forming devices 50, in this embodiment, the type, the number, or the connection forms of devices that are directly or indirectly connected to the network 4 is not limited thereto. In addition, for convenience of the description, a configuration is employed in which there is one network 4. However, as long as the job accepting device 10 and the image forming devices 50 can perform data communication with the calculation resources 6 present in the cloud 2, the connection form of the network 4 is not limited to the example illustrated in FIG. 1.

Figure 2:
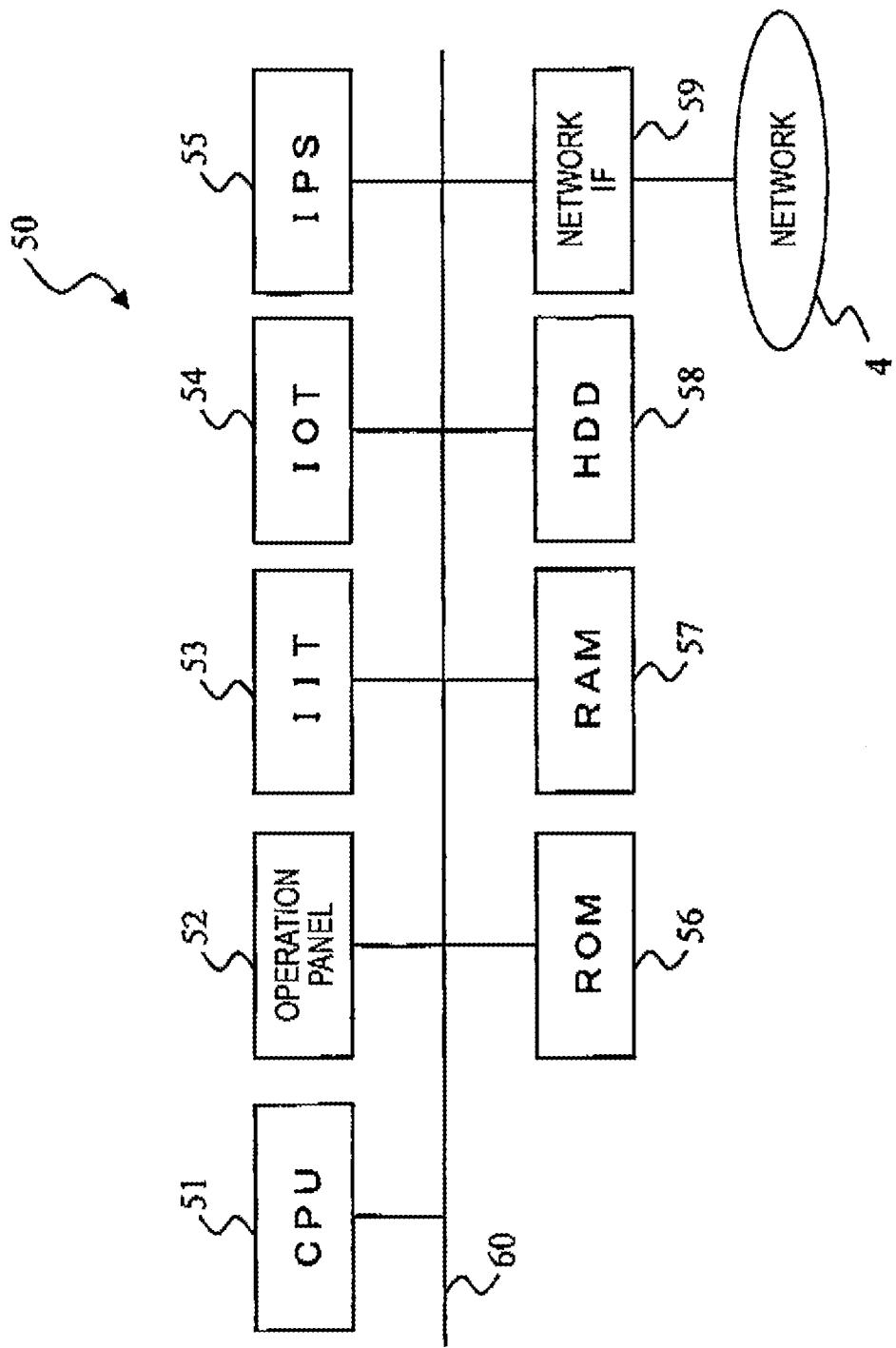
FIG. 2 is a diagram illustrating an example of a hardware configuration of an image forming device according to this embodiment.

FIG. 2 is a view showing an example of a hardware configuration of the image forming apparatus 50 according to this embodiment. The image forming apparatus 50 is an apparatus equipped with various functions as described above and incorporating a computer. Referring to FIG. 2, a CPU 51 controls the operations of various devices mounted on this apparatus, such as an IIT (image input terminal) 53, an IOT (image output terminal) 54, according to programs stored in a ROM 56. The IIT 53 is an image input device that reads a manuscript set by the user and stores obtained data as electronic data in an HDD (hard disk drive) 5S or the like. The IIT 53 may be accomplished by a scanner, for example. The IOT 54, serving as an image output device, prints images on output paper according to instructions from control programs executed by the CPU 51. The JOT 54 may be accomplished by a printer, for example. An address data bus 60 is connected to various devices that are controlled by the CPU 51 to perform data communication. The operation panel 52 receives instructions from the user and indicates information. An IPS (image processing system) 55, serving as an image processing apparatus, executes the processing of images contained in a received job. The ROM (read-only memory) 56 stores various programs regarding the control of this apparatus, encrypted electronic data and the transmission/reception of the electronic data. Various components described later carry out their predetermined functions when the various programs are executed. A RAM (random access memory) 57 is used as a work memory when programs are executed or as a communication buffer when electronic data is transmitted/received. In this embodiment, the RAM 57 may also be used as a job queue. The HDD 58 stores electronic documents or the like read by the IIT 53. A network interface (I/F) 59 is used for connection to the network 4, data communication with the job accepting device 10, reception of a result of the execution of a sub-job that is transmitted from the calculation resource 6, and the like.

Figure 3:
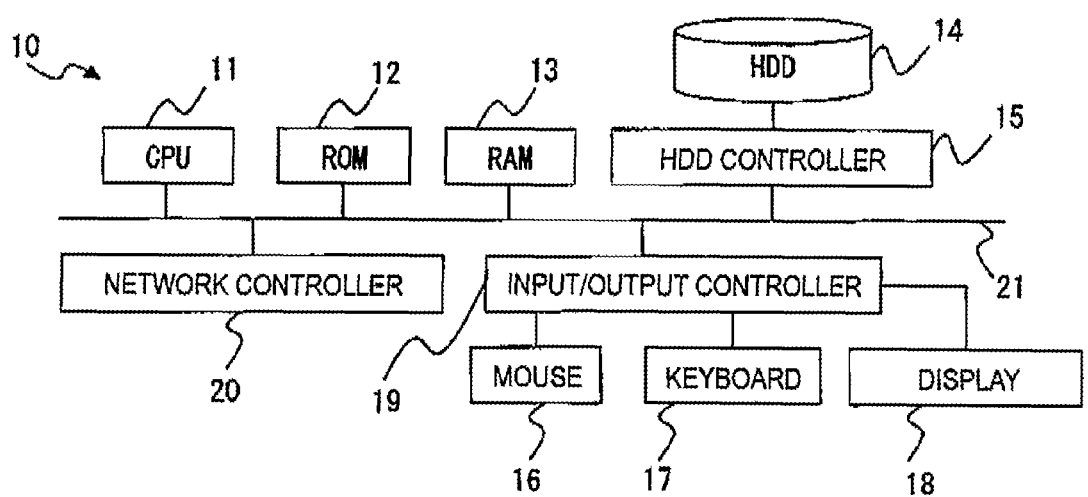
FIG. 3 is diagram illustrating a hardware configuration of a server computer that forms a job accepting device according to this embodiment.

FIG. 3 is diagram illustrating a hardware configuration of a server computer that forms a job accepting device 10 according to this embodiment. The server computer that forms the job accepting device 10 according to this embodiment can be implemented by a previously existing general-purpose hardware configuration. In other words, the computer, as illustrated in FIG. 3, is configured by connecting a CPU 11, a ROM 12, a RAM 13, an HDD controller 15 that is connected to a hard disk drive (HDD) 14, a mouse 16 and a keyboard 17 disposed as input means, an input/output controller 19 that is connected to a display 18 disposed as a display device, and a network controller 20 disposed as communication means to an internal bus 21.

In FIGS. 1 and 2, the job accepting device 10 and the image forming device 50 are illustrated as separate devices. However, in a case where the job accepting device 10 is configured so as to be assembled into the image forming device 50, an operation panel 52 is used as the input means and the display device.

Figure 4:
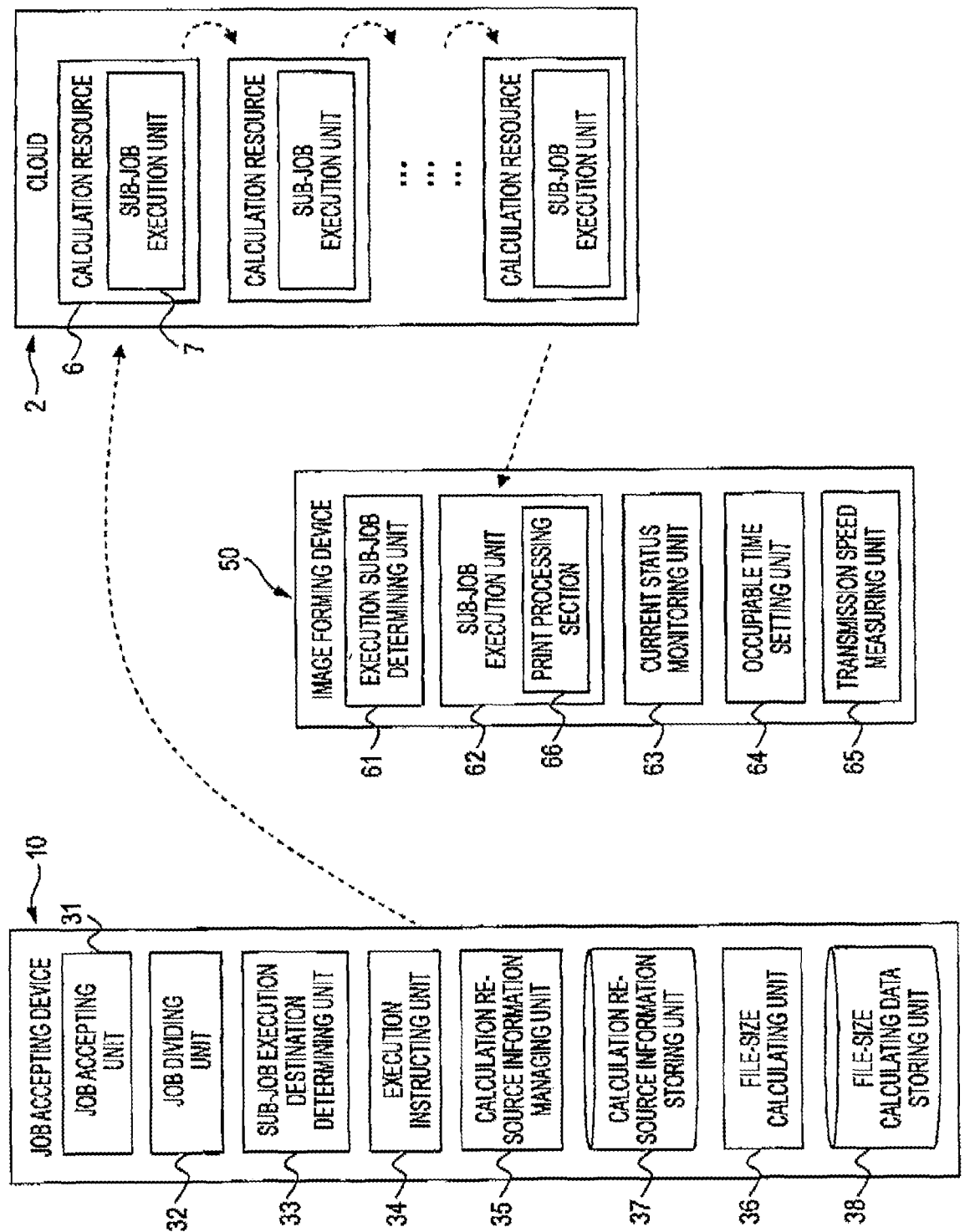
FIG. 4 is a block diagram illustrating the configuration of a job distribution processing system according to this embodiment.

FIG. 4 is a block diagram illustrating the configuration of a job distribution processing system according to this embodiment.

The job accepting device 10 according to this embodiment includes a job accepting unit 31, a job dividing unit 32, a sub-job execution destination determining unit 33, an execution instructing unit 34, a calculation resource information managing unit 35, a file-size calculating unit 36, a calculation resource information storing unit 37, and a file-size calculating data storing unit 38. The job accepting unit 31 accepts a job execution request. The job dividing unit 32 divides the accepted job into N (here, N is an integer equal to or greater than two) sub-jobs as a plurality of sub-jobs. The sub-job execution destination determining unit 33 determines a device, that is, the image forming device 50 or the calculation resource 6 that executes a sub-job for each divided sub-job. In addition, in the process of determining the execution destination of the sub-job, the sub-job execution destination determining unit 33 assigns the calculation resources 6 planned to execute each sub-job for the sub-jobs executed first to (N−1)-th by referring to the information stored in the calculation resource information storing unit 37. Such assignment of the calculation resources 6 is referred to as a "preliminary determination" in this embodiment. When the execution destination of each sub-job is determined, the execution instructing unit 34 instructs the image forming device 50 or the calculation resource 6 as the execution destination to execute the corresponding sub-job in the execution sequence. In the calculation resource information storing unit 37, information (hereinafter, referred to as "calculation resource information") relating to the processing capability of the calculation resources 6 is stored. The calculation resource information includes replacement device capability information. The calculation resource information includes, for example, information relating to the hardware configuration, the capability, and software such as installed applications of each calculation resource 6 as information that is necessary for acquiring the processing capability of each calculation resource 6. In addition, in the calculation resource information, information relating to the data transmission speed between the calculation resources 6, for example, information such as the maximum data transmission amount per unit time is stored. The calculation resource information managing unit 35 collects the calculation resource information of each calculation resource 6 included in the cloud 2 and registers the calculation resource information in the calculation resource information storing unit 37. In addition, the calculation resource information managing unit 35 performs information management such as updating the calculation resource information stored in the calculation resource information storing unit 37 in real time, on a regular basis, or the like. The file-size calculating unit 36 calculates the file size of data acquired as a result of the execution when each job, which has not been executed, is executed, by referring to the information registered in the file-size calculating data storing unit 38.

The constituent elements 31 to 36 of the job accepting device 10 are implemented by cooperative operations of the computer that configures the job accepting device 10 and programs operating in the CPU 11 built into the computer. In addition, the storing units 37 and 38 are implemented by an HDD 14 that is built into the job accepting device 10.

FIG. 5 is a diagram illustrating an example of file-size calculating data that is registered in a file-size calculating data storing unit 38 according to this embodiment. In FIG. 5, the process content for specifying a process performed by a specific sub-job and, as information relating to data received as a result of the execution of a immediately prior sub-job, an input color representing information relating to the color, input encoding representing the encoding, and an input file size representing the file size are illustrated. In addition, as information relating to data to be delivered to the next sub-job as a result of the execution of this process, an output color representing information relating to the color of data to be output, output encoding representing the encoding, and an output file size representing the file size are illustrated.

The image forming device 50 according to this embodiment includes an execution sub-job determining unit 61, a sub-job execution unit 62, a current status monitoring unit 63, an occupiable time setting unit 64, and a transmission speed measuring unit 65. In a case where the job requested to be executed is a print job, although the image forming device 50 performs at least the N-th sub-job that is executed lastly in the execution sequence of sub-jobs as a sub-job including a printing process out of the plurality of sub-jobs that are generated by dividing a job, the execution sub-job determining unit 61 determines a sub-job to be executed by the image forming device 50 in consideration of the processing capability of the image forming device 50 by referring to the current state of the image forming device 50, that is, the information relating to the current use status of the image forming device 50 or the like in cooperation with the sub-job execution destination determining unit 33 of the job accepting device 10. In addition, the execution sub-job determining unit 61, in the process of determining a sub-job to be executed by the image forming device 50, determines whether or not the image forming device 50 has available capacity for executing a sub-job other than the N-th sub-job in consideration of the processing capability of the image forming device 50 based on the current use status of the image forming device 50 and the resources of the image forming device 50 that are required for executing the job. The sub-job execution unit 62 executes the sub-job that is determined to be executed by the image forming device 50. A print processing section 66 included in the sub-job execution unit 62 performs a printing process that is included in the N-th sub-job. The current status monitoring unit 63 collects the current use status of the hardware and software configurations of the image forming device 50 and supplies the collected information to the execution sub-job determining unit 61. The occupiable time setting unit 64 sets an occupiable time that represents a maximum time length for which the image forming device 50 can be occupied for executing one or a plurality of sub-jobs included in one job. For example, in a case where the image forming device 50 is shared by a plurality of users, there is a case where it is desired that occupation of the image forming device 50 for a long time by one job (one user) is avoided. Accordingly, in this embodiment, an occupiable time is set. Although the occupiable time may be one fixed value, a value that changes in accordance with the time zone such as day or night during which the job is executed may be set as the occupiable time. The transmission speed measuring unit 65 measures the transmission speed between the image forming device 50 and the calculation resources 6.

The constituent elements 61 to 65 of the image forming device 50 are realized by a cooperative operation of the computer built into the image forming device 50 and programs that are executed by the CPU 51 built into the computer.

Each calculation resource 6 included in the cloud 2 according to this embodiment includes a sub-job execution unit 7 that executes a sub-job that is assigned and sent by the job accepting device 10. The sub-job execution unit 7 is realized by a cooperative operation of the computer configuring the calculation resource 6 and a program executed by the CPU built into the computer.

Furthermore, programs to be used in this embodiment can be provided through the communication means as a matter of course and can also be provided as being stored in computer-readable recording media, such as CD-ROMs and DVD-ROMs. The programs provided by the communication means or recording media are installed in the computer, and the installed programs are executed sequentially by the CPU of the computer to execute various kinds of processing.

Figure 6:
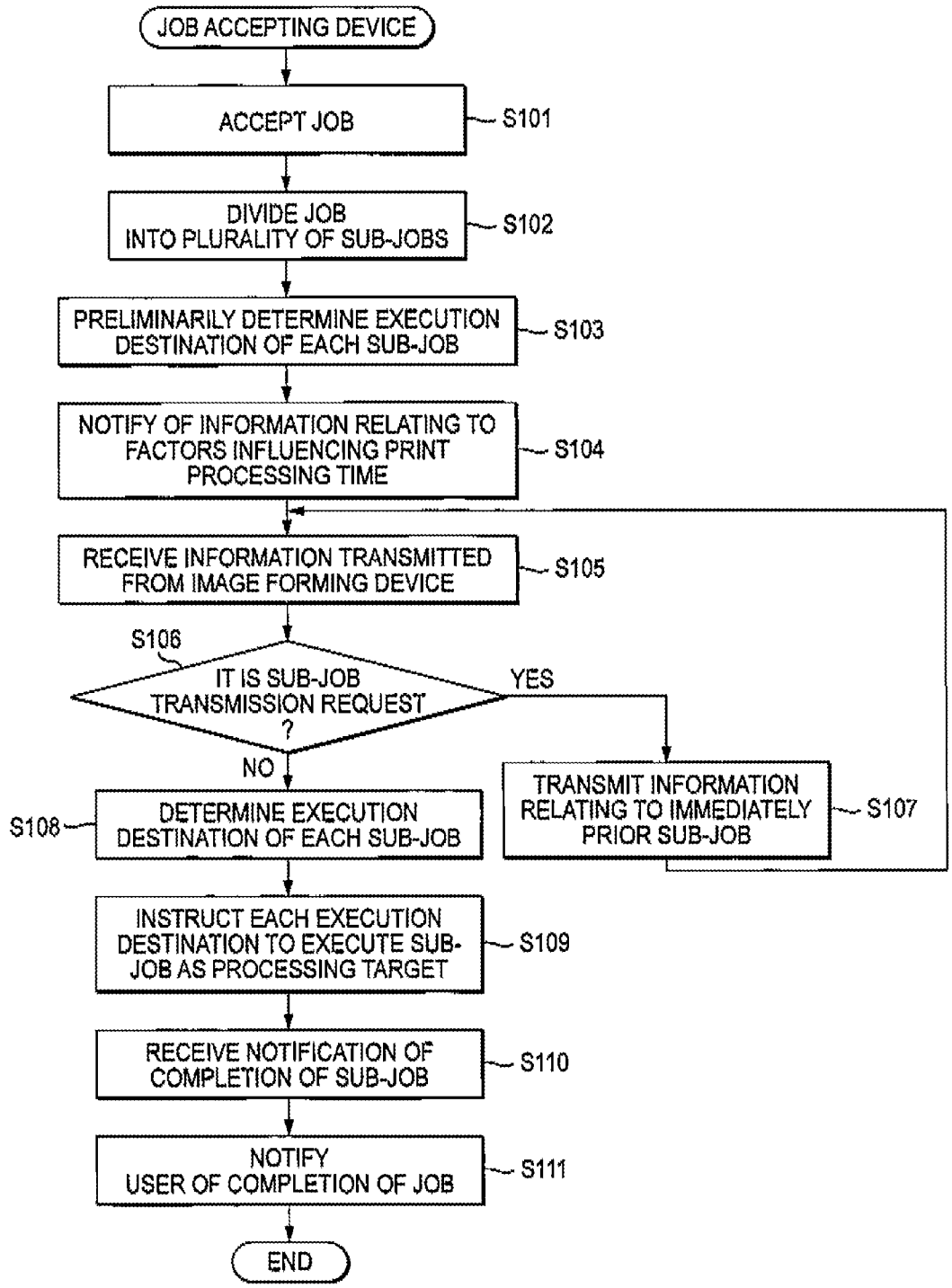
FIG. 6 is a flowchart illustrating the process of a job accepting device according to this embodiment.
Figure 7:
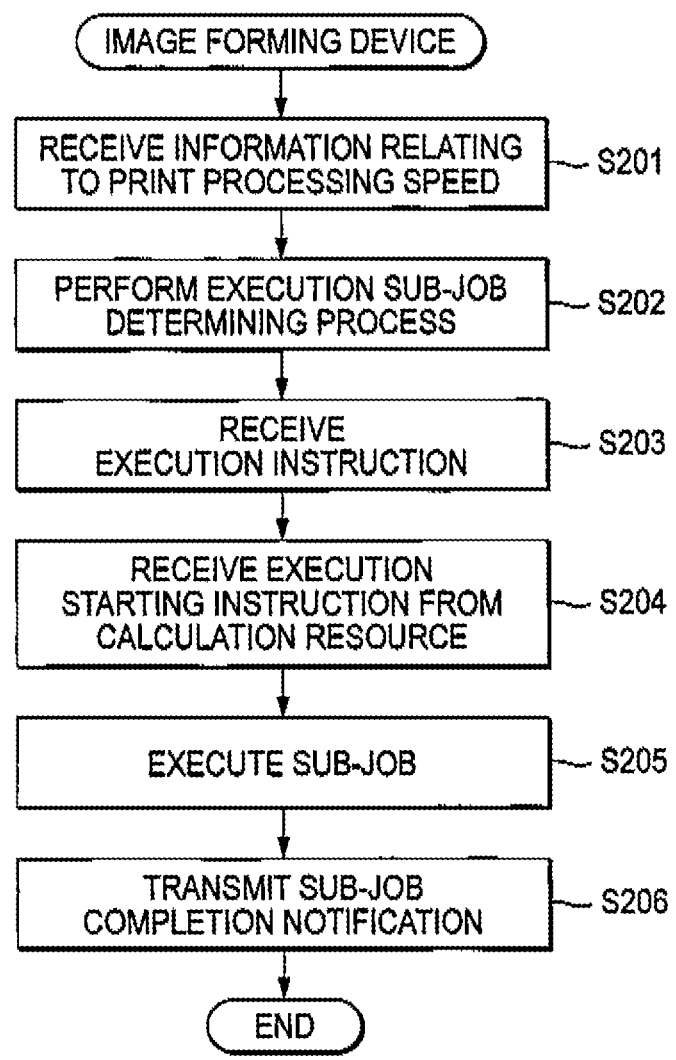
FIG. 7 is a flowchart illustrating the process of an image forming device according to this embodiment.

FIG. 6 is a flowchart illustrating the process of the job accepting device 10 according to this embodiment FIG. 7 is a flowchart illustrating the process of an image forming device 50 according to this embodiment. FIG. 8 is a flowchart illustrating an execution sub-job determining process illustrated in FIG. 7. Hereinafter, the process from accepting a job until completing the job in this embodiment will be described with reference to these figures. In this embodiment, a case will be described as an example in which a print job for allowing the image forming device 50 to perform printing and acquiring a printed material as a result of the execution of the job is executed.

The job accepting unit 31 accepts a job execution request from a user (Step 101). The job execution request may be performed by a user designating the image forming device 50 to execute a job from a personal computer not shown in the figure or the like and transmitting the job together with electronic data as a processing target to the job accepting device 10 through a network. Alternatively, in a case where the job accepting device 10 is assembled into the image forming device 50, a user may set a desired parameter by operating the operation panel 52 and issue a job execution request, for example, by pressing a start button or the like. At this time, a document may be scanned from an IIT 53.

When the job execution request is accepted, the job dividing unit 32 divides the accepted job into a plurality of sub-jobs (Step 102). Generally, the job is divided into functional units or the like. However, in this embodiment, the method of dividing the job is not particularly limited. In a case where a print job is divided into a plurality of sub-jobs, a sub-job that is executed lastly is a sub-job that is executed for performing a printing process of outputting the result of the execution (printed material) and is a sub-job that is executed by the image forming device 50.

Next, the sub-job execution destination determining unit 33 assigns each sub-job to the calculation resource 6 or the image forming device 50 as an execution destination. Before the process of determining the execution destination is described, a viewpoint from which the execution destination of a sub-job is determined will be described.

According to this embodiment, a job is divided into a plurality of sub-jobs, and the sub-jobs are processed in the execution sequence, whereby the job is executed. Each of the calculation resources 6 and the image forming device 50 sequentially executes the sub-job thereof in the execution sequence of the sub-jobs, and when the execution of the sub-job is completed, for the execution of the sub-job of the next device 6 or 50, each device 6 or 50 delivers the result of the execution of the sub-job therein in addition to a sub-job execution instruction. In other words, the processing time of a job is acquired not only by adding the processing time of the sub-job in each device 6 or 50 together but also by adding the data transmission time between the devices 6 and 50 thereto.

As described above, the image forming device 50 according to this embodiment executes the N-th sub-job. Basically, since the processing speed of the calculation resource 6 is higher than that of the image forming device 50, it is understood that the calculation resource 6 is preferably used for the execution of a sub-job. However, in a case where the amount of data (the execution result) transmitted from the calculation resource 6 to the image forming device 50 is massive, more transmission time is required. Accordingly, even in a case where the processing time required for the execution of the sub-job is shortened, there is a possibility that the execution of the sub-job using the image forming device 50 shortens a resultant processing time with the transmission time being considered. When described in a specific example, in a case where a printing process is performed in the N-th sub-job, in a case where, for example, a skew eliminating process is performed in the (N−1)-th sub-job, when the amount of data transmission of binary data as the execution result of the calculation resource 6 that has executed the (N−1)-th sub-job is massive, more data transmission time is required. Accordingly, in a case where the skew eliminating process is performed by the image forming device 50, the data transmission time does not need to be included in the processing time, and therefore there is a possibility that the processing time is consequently shortened. In addition, in a case where, for example, an offset eliminating process is performed in the (N−2)-th sub-job, when the amount of data transmission of binary data as the execution result of the calculation resource 6 that has executed the (N−2)-th sub-job is massive, more data transmission time is required. Accordingly, in a case where the offset eliminating process is performed by the image forming device 50, there is a possibility that the processing time is consequently shortened. In this case, the execution result of the (N−3)-th sub-job is transmitted to the image forming device 50, and thus the transmission time needs to be considered.

In other words, in the sub-job execution destination determining process according to this embodiment, by acquiring i for which the processing time for the job in a case where the i-th (here, $2 \leq i \leq N$) to N-th sub-jobs are executed by the image forming device 50 is shorter than that for the job in a case where the (i−1)-th to N-th sub-jobs are executed by the image forming device 50 in consideration of the tradeoff between the shortening of the processing time by utilizing the processing capability of the calculation resources 6 and the data transmission time from the calculation resources 6 to the image forming device 50, the sub-jobs to be executed by the calculation resources 6 and the sub-jobs to be executed by the image forming device 50 are determined.

In addition, in order not to generate the data transmission time, although a job may be considered to be executed only by the image forming device 50 without using the calculation resource 6, generally, the processing capability of the cloud 2 is higher than that of the image forming device. Furthermore, it matters whether or not there is available capacity in the image forming device 50 for executing a sub-job other than the N-th sub-job, and the above-described occupiable time is set in the image forming device 50.

The object of this embodiment is to shorten the processing time required for executing a job. Thus, even in a case where the data transmission of the execution results of sub-jobs between the calculation resources 6 and the image forming device 50 is performed several times, logically, there may be possibility that the processing time can be relatively shortened in the case. However, according to this embodiment, in a case where the continuous jobs of the i-th (here, $2 \leq i \leq N$) to N-th jobs are executed by the image forming device 50, the data transmission from the calculation resource 6 to the image forming device 50 is performed only once, and accordingly, the processing time of a job is assumed to be relatively shortened in this case, and in this embodiment, the description will be presented considering a case where the sub-jobs are continuously executed by the image forming device 50.

Now, the description of the process of the sub-job execution destination determining unit 33 with reference to FIG. 6 will be returned to. The sub-job execution destination determining unit 33 recognizes a hardware resource and a software resource such as an application that are necessary for executing a sub-job for each sub-job by analyzing the processing content of each sub-job acquired by dividing the job. Since the hardware resource and the software resource included in each calculation resource 6 are included in the calculation resource information that is stored in the calculation resource information storing unit 37, the sub-job execution destination determining unit 33 selects a calculation resource 6 that can execute each sub-job by comparing the resources necessary for executing each sub-job with the calculation resource information. At this time, a calculation resource 6 is selected for which the execution time of the sub-job and the transmission time between the calculation resources 6 are shorter than those of other calculation resources 6 by referring to the information relating to the processing capability of the calculation resources 6 such as the capability of the CPU and the amount of memory (or the memory use amount at the current time point) and the data transmission capability between the calculation resources 6 that are included in the calculation resource information. In this way, a calculation resource 6 planned to execute each sub-job is preliminarily determined for the first to (N−1)-th sub-jobs out of the first to N-th sub-jobs acquired by dividing the job (Step 103). Here, the preliminary determination is performed since there is a sub-job that may be performed by the image forming device 50 as described later.

When preliminarily determining the planned calculation resources 6 to execute the first to (N−1)-th sub-jobs, the sub-job execution destination determining unit 33 generates information relating to factors influencing the processing time of the N-th sub-job such as a page size, output colors, the number of pages, and the number of characters by further analyzing the job and notifies the image forming device 50 of the generated information (Step 104). Thereafter, the job accepting device 10 enters a waiting state for information transmitted from the image forming device 50.

As illustrated in FIG. 7, when receiving the information transmitted in Step 104 (Step 201), the execution sub-job determining unit 61 of the image forming device 50 determines the sub-job to be executed in the image forming device 50 as follows (Step 202). This execution sub-job determining process will be described in detail with reference to FIG. 8.

First, the execution sub-job determining unit 61 determines whether or not there is available capacity in the image forming device 50 at the current time point (Step 2021). The available capacity represents that the use state of the image forming device 50 such as the use rate of the CPU, the amount of used memory, and the available capacity of the HDD at the current time point has not reached a threshold value, and thus there is room for executing a sub-job. Here, since the N-th sub-job is determined to be executed, analyzing whether or not there is room in the available capacity of the HDD and the like based on the assumption that the N-th sub-job is executed is needed. Described in more detail, the execution sub-job determining unit 61 determines whether or not a process other than the N-th sub-job including a printing process is to be performed by analyzing the information accepted from the job accepting device 10 in Step 201 and the information representing the current status of the image forming device 50 that is collected by the current status monitoring unit 63. For example, the current states of the image forming device 50 are compared with threshold values set in advance for determining whether the use rate of the CPU is a specific rate or less, the amount of used memory is a specific rate or less, and the number of registered job queues is a specific value or less, and whether or not there is room may be determined based on whether all the indices are equal to or less than the corresponding threshold values or the number or the proportion of indices that are equal to or less than the corresponding threshold values as the result of the comparison.

In a case where it is determined that there is no available capacity (No in Step 2022), the execution sub-job determining unit 61 notifies the job accepting device 10 that there is no available capacity (Step 2023).

On the other hand, in a case where it is determined that there is available capacity (Y in Step 2022), the image forming device 50 is configured to execute only the N-th sub-job at this time point, and thus the execution sub-job determining unit 61 transmits a transmission request used for requesting for the information relating to the (N−1)-th sub-job that is executed immediately prior to the N-th sub-job to be sent to the job accepting device 10, thereby requesting provision of the information (Step 2024).

As illustrated in FIG. 6, when the information transmitted from the image forming device 50 is received (Step 105), in a case where the received information is an information transmission request (Yes in Step 106), the sub-job execution destination determining unit 33 transmits the information relating to the (N−1)-th sub-job that is designated in the transmission request to the image forming device 50 (Step 107). In the information relating to the (N−1)-th sub-job, information that is necessary for calculating the processing time in the image forming device 50 is included. To be more specific, the use rate of the CPU, the amount of used memory, and the like are included in the information. In addition, as one type of the necessary information, there is a size of the execution result that is generated by executing the (N−1)-th sub-job. In this embodiment, since it is assumed that the execution result is transferred to the next sub-job in a file format, the file size of a data file including the execution result is acquired in this embodiment. In addition, since the sub-job is not executed, the file size cannot be actually measured and needs to be acquired through calculation based on specific information. An example of acquiring the file size is represented below.

For example, in a case where an offset eliminating process is performed in a sub-job as a calculation target, when the processing target data input to the offset eliminating process is 2500 KB, in the example illustrated in FIG. 5, by using data of the 5th and 6th records from the top having 2500 KB interposed therebetween, the execution result (output data) of the offset eliminating process is calculated as 290+((850−290/(3000−1000))×(2500−1000)=710 KB. The output data is acquired for other sub-jobs using the same calculation method. In addition, in a case where the size of the input processing target data is out of the range of the data registered in the file-size calculating data storing unit 38, the file size is acquired from extrapolation other than interpolation between two points described above.

The file size has a tendency to depend on the data type as it is approximately in proportion to the page size x the number of pages in a case where the encoding is Raw. Accordingly, the file-size calculating unit 36 calculates output data using a calculation equation on which such a tendency is reflected in the process of calculation. In this embodiment, although the data used for calculating the file size is registered in advance in the file-size calculating data storing unit 38, the precision of the estimated file size may be improved by accumulating the size of the output file acquired from the result of actual execution of the sub-job in the file-size calculating data storing unit 38.

As illustrated in FIG. 8, when information relating to the (N−1)-th sub-job that includes the file size and the like is transmitted, the execution sub-job determining unit 61 of the image forming device 50 receives the information (Step 2025). Then, the processing time in a case where the N-th and (N−1)-th sub-jobs are executed by the image forming device 50 is calculated by referring to the information relating to the (N−1)-th sub-job. In a case where the processing time for executing the N-th and (N−1)-th sub-jobs exceeds the occupiable time (Yes in Step 2027), in order not to allow the image forming device 50 to be occupied by sub-jobs included in one job for an occupiable time or longer, the execution of the (N−1)-th sub-job is determined to be impossible. Consequently, the execution sub-job determining unit 61 determines that the sub-job executed by the image forming device 50 is only the N-th sub-job (Step 2029). Then, the execution sub-job determining unit 61 notifies the job accepting device 10 that only the N-th sub-job is to be executed by the image forming device 50 (Step 2030).

On the other hand, in a case where the processing time required for executing the N-th and (N−1)-th sub-jobs does not exceed the occupiable time (No in Step 2027), subsequently, it is checked whether the processing time of the entire job is shortened by executing the (N−1)-th sub-job using the image forming device 50. This process will be described in detail with reference to FIG. 9.

Figure 9A:
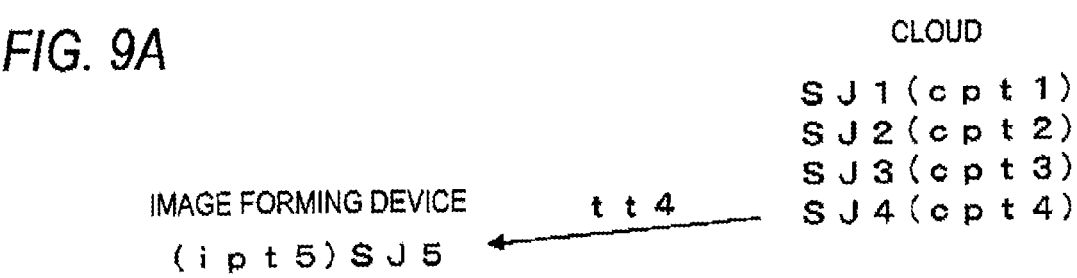
FIG. 9A is a conceptual diagram that is used for illustrating a difference in the processing time after sub-jobs are distributed to clouds and image forming devices according to this embodiment.
Figure 9B:
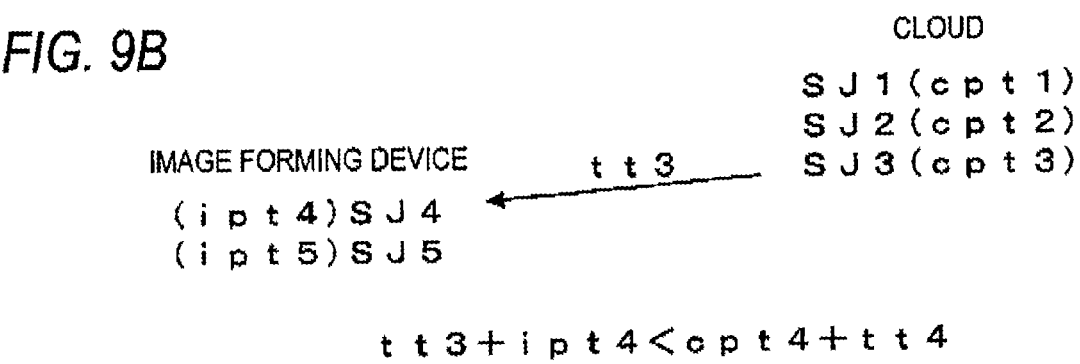
FIG. 9B is a conceptual diagram that is used for illustrating a difference in the processing time after sub-jobs are distributed to clouds and image forming devices according to this embodiment.
Figure 9C:
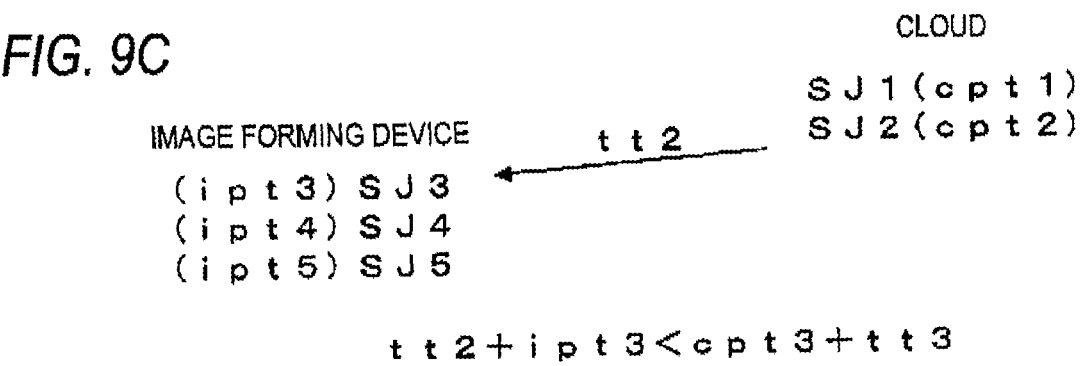
FIG. 9C is a conceptual diagram that is used for illustrating a difference in the processing time after sub-jobs are distributed to clouds and image forming devices according to this embodiment.

FIGS. 9A to 9C are conceptual diagrams illustrating the states after sub-jobs are distributed to the cloud 2 or the image forming device 50. In FIGS. 9A to 9C, "SJi" represents a sub-job, "cpti" represents a processing time (execution time) required for executing a corresponding sub-job in a corresponding calculation resource 6, "tti" represents a time (transmission time) required for a transmission process of the execution result (output data) acquired by executing a sub-job by using a calculation resource 6 from the calculation resource 6 to the image forming device 50, and "ipti" represents a processing time (execution time) required for executing a corresponding sub-job in the image forming device 50. In addition, a variable "i" included at the end of each item is a number identifying each item such as a sub-job, and numbers are sequentially assigned thereto from one along the execution sequence of the sub-jobs. In FIGS. 9A to 9C, since sub-jobs of N=5 are described as an example, the maximum value of i is five. In addition, here, since the processing of the sub-job or the data transmission has not actually been performed yet, the time used here is an estimated time required for performing each process as an estimated processing time acquired through calculation. As the processing time, the processing time required for processing performed on the image forming device 50 side is calculated in Step 2026. The execution time of the sub-job executed on the calculation resource 6 side may be acquired from the job accepting device 10 in Step 2025. The transmission time can be calculated based on the file size acquired from the job accepting device 10 and the transmission speed per unit. The transmission speed measuring unit 65 acquires the transmission speed per unit through actual measurement by performing communication with the corresponding calculation resource 6.

In this embodiment, it is checked whether or not the processing time of the entire job is shortened while sequentially decreasing the value of the variable i (here, i is a positive integer) from N. First, FIG. 9A is a case where only the fifth (i=N) sub-job SJ5 is executed on the image forming device 50 side. FIG. 9B is an example of a case where there is available capacity in the image forming device 50, and the fourth (i=N−1) sub-job SJ4 is also attempted to be executed by the image forming device 50. When FIGS. 9A and 9B are compared with each other, the execution time cpt4 of the sub-job SJ4 and the transmission time tt4 of the execution result of the sub-job SJ4 shown in FIG. 9A and the transmission time tt3 of the execution result of the 3rd (i=N−2) sub-job SJ3 and the execution time ipt4 of the sub-job SJ4 shown in FIG. 9B are represented as differences in the processing time. Since the processing time of each of the sub-jobs SJ1 to SJ3 and SJ5 is the same in FIGS. 9A and 9B, the processing times do not need to be compared with each other, and the description thereof is omitted here.

Here, the processing time is cpt4+tt4 in the case illustrated in FIG. 9A, and the processing time is tt3+ipt4 in the case illustrated in FIG. 9B. Thus, the processing time appears to be shortened when the relationship of "cpt4+tt4>tt3+ipt4" is satisfied.

In other words, in a case where the processing time of the image forming device 50, which is represented by ipt4+ipt5, and the threshold value TH that is the occupiable time satisfies the relationship of "ipt4+ipt5<TH" in Step 2027, and the relationship of "cpt4+tt4>tt3+ipt4" is satisfied in Step 2028, even when the 4-th (i=N−1) sub-job is executed by the image forming device 50, the image forming device 50 is not occupied over the predetermined occupiable time, and the processing time of the job appears to be shortened as well. Accordingly, the execution sub-job determining unit 61 determines that the 4-th (i=N−1) sub-job is executed by the image forming device 50.

As above, in a case where the processing time is determined to be shortened by executing the (N−1)-th sub-job using the image forming device 50 (Yes in Step 2028), in order to determine whether the (N−2)-th sub-job that is a sub-job immediately prior to the (N−1)-th sub-job can be executed by the image forming device 50, the execution sub-job determining unit 61 transmits a transmission request for information relating to the (N−2)-th sub-job that is immediately prior to the (N−1)-th sub-job to the job accepting device 10, thereby requesting provision of the information (Step 2024).

After this process, the above-described process (Yes in Step 106 and Step 107, which are illustrated in FIG. 6, and Steps 2024 to 2028 illustrated in FIG. 8) is repeated, and thus the description of a detailed process is omitted here, and the processes of Steps 2027 and 2028 will be checked with reference to FIGS. 9B and 9C.

FIG. 9C is an example of a case where the 3rd (i=N−2) sub-job SJ3 is additionally attempted to be executed by the image forming device 50. When FIGS. 9B and 9C are compared with each other, the execution time cpt3 of the 3rd sub-job SJ3 and the transmission time tt3 of the execution result of the 3rd sub-job SJ3 shown in FIG. 9B and the transmission time tt2 of the execution result of the 2nd (i=N−3) sub-job SJ2 and the execution time ipt3 of the sub-job SJ3 shown in FIG. 9C are represented as differences in the processing time. Since the processing time of each of the sub-jobs SJ1, SJ2, SJ4, and SJ5 is the same in FIGS. 9B and 9C, the processing times do not need to be compared with each other, and the description thereof is omitted here.

Here, in a case where the relationship of "ipt3+ipt4+ipt5<TH" is satisfied (No in Step 2027), the processing time is cpt3+tt3 in the case illustrated in FIG. 9B, and the processing time is tt2+ipt3 in the case illustrated in FIG. 9C. Thus, it is determined that the processing time appears to be shortened when the relationship of "cpt3+tt3>tt2+ipt3" is satisfied (Yes in Step 2028). Then, the process is returned back to Step 2024 and proceeds to a process of determining whether or not the (N−3)-th sub-job that is a sub-job immediately prior to the (N−2)-th sub-job can be executed by the image forming device 50.

In other words, in a case where it is determined that the occupiable time is exceeded by executing the (i−1)-th (2≦i≦N) sub-job using the image forming device 50 (Yes in Step 2027), or the processing time cannot be shortened starting from "cpt3+tt3<tt2+ipt3", (No in Step 2028), the execution sub-job determining unit 61 determines that the (i−1)-th sub-job is not to be executed by the image forming device 50, and the sub-jobs executed by the image forming device 50 are the i-th to N-th sub-jobs (Step 2029). When the variable i is specified in this way, the execution sub-job determining unit 61 notifies the job accepting device 10 that the sub-jobs executed by the image forming device 50 are the i-th to N-th sub-jobs (Step 2030).

As illustrated in FIG. 6, when the information transmitted from the image forming device 50 is received (Step 105), in a case where the received information is a notification, which represents that the sub-jobs executed by the image forming device 50 are the i-th to N-th sub-jobs, of Step 2030 illustrated in FIG. 8 or a notification, which represents that there is no available capacity, of Step 2023 illustrated in FIG. 8 (No in Step 106), the sub-job execution destination determining unit 33 determines the execution destination of each sub-job based on the notification from the image forming device 50 (Step 108). To be more specific, in a case where the received information is the notification, which represents that there is no available capacity, of Step 2023 illustrated in FIG. 8, it is determined that the first to (N−1)-th sub-jobs are executed by the cloud 2, and the N-th sub-job is executed by the image forming device 50. In other words, the execution destinations that have been preliminarily determined in Step 103 illustrated in FIG. 6 are used without being changed. On the other hand, in a case where the received information is the notification, which represents the execution of the i-th to N-th sub-jobs, of Step 2030 illustrated in FIG. 8, it is determined that the first to (i−1)-th sub-jobs are executed by the cloud 2, and the i-th to N-th sub-jobs are executed by the image forming device 50. In other words, the execution destination of the i-th to (N−1) sub-jobs out of the i-th to (N−1)-th sub-jobs that have been preliminarily determined in Step 103 illustrated in FIG. 6 is changed from any one of the calculation resources 6 to the image forming device 50.

When the execution destination of each sub-job is determined as above, the execution instructing unit 34 instructs the corresponding calculation resource 6 and the image forming device 50 to execute the sub-jobs as the processing targets (Step 109). However, since the sub-jobs are sequentially executed from the first sub-job, the calculation resource 6 or the image forming device 50 in charge of the second sub-job or a sub-job after that receives an execution starting instruction and an execution result from the calculation resource 6 that has been executed immediately before and then starts to execute the corresponding sub-job.

When the sub-jobs are sequentially executed by the sub-job execution units 7 of the calculation resources 6 of the cloud 2, and the last process of the calculation resource 6 is completed, the calculation resource 6 instructs the image forming device 50 to execute the sub-job. When receiving an execution starting instruction for a sub-job from the calculation resource 6 (Step 204) after reception of an instruction from the job accepting device 10 (Step 203), the image forming device 50 allows the sub-job execution unit 62 to execute the sub-job (Step 205). Then, the print processing section 66 executes the sub-job that includes the last N-th printing process, whereby a printed material as an execution result of the job is output.

When the execution of the N-th sub-job is completed as above, the sub-job execution unit 62 notifies the job accepting device 10 of the completion of the execution of the sub-job (Step 206).

As illustrated in FIG. 6, when receiving the notification of the completion of the execution of the sub-job (Step 110), the job accepting device 10 notifies the user as a request source of the completion of the accepted job (Step 111).

According to this embodiment, as described above, a job is divided into a plurality of sub-jobs, and the sub-jobs acquired by dividing the job are executed by the cloud 2 or the image forming device 50 in a divisional manner.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A job distribution processing system comprising:
a processor;
an execution destination determining device that accepts an executing request of a job, that divides the accepted job into N sub-jobs and that determines an execution destination of each of the sub-jobs;
wherein N is an integer equal to or greater than three,
a job execution device that is designated as a destination of the job executing request and that executes at least a sub-job which is executed N-th as the last sub-job out of the N sub-jobs; and
one or a plurality of sub-job replacement devices that execute a sub-job other than the sub-job executed by the job execution device instead of the job execution device,
wherein the execution destination determining device includes:
a first acquiring unit that acquires replacement device capability information relating to a processing capability of each of the sub-job replacement devices; and
a sub-job assigning unit that assigns the sub-jobs which are performed first to (N−1)-th to the sub-job replacement devices which are planned to execute the first to (N−1)-th sub-jobs by referring to the replacement device capability information,
wherein the job execution device includes:
a second acquiring unit that acquires information relating to a current use status of the job execution device;
a third acquiring unit that acquires information relating to data transmission between the job execution device and the sub-job replacement device;
a calculation unit that calculates a first processing time and a second processing time, while sequentially decreasing a value of a variable i from N based on the replacement device capability information, the information relating to the current use status of the job execution device, and the information relating to data transmission between the job execution device and the sub-job replacement devices,
wherein i is a positive integer,
the first processing time is calculated by adding a first execution time at a time when a (i−1)-th sub-job is executed by the sub-job replacement device assigned by the sub-job assigning unit and a first transmission time required for transmitting data of an execution result of the (i−1)-th sub-job from the sub-job replacement device to the job execution device, and
the second processing time is calculated by adding a second execution time at a time when the (i−1)-th sub-job is executed by the job execution device and a second transmission time required for transmitting data of an execution result at a time when a (i−2)-th sub-job is executed by the sub-job replacement device which is assigned by the sub-job assigning unit from the sub-job replacement device to the job execution device,
a specifying unit that specifies one variable i when the first processing time is shorter than the second processing time primarily in the case that a value of a variable i is sequentially decreased from N, as a result of comparing the first processing time with the second processing time which are calculated by the calculation unit,
wherein the execution determining device determines the sub-job replacement devices, which are assigned by the sub-job assigning unit, as the execution destinations of the first to (i−1)-th sub-jobs, and that determines the job execution device as the execution destination of the i-th to N-th sub-jobs, in accordance with the one variable i specified by the specifying unit.

2. The job distribution processing system according to claim 1, wherein
the execution destination determining device includes a setting unit that sets an occupiable time indicating a maximum time length for which the job execution device is occupied for executing one job, and
the one variable i is specified in a range in which a processing time required for executing the i-th to N-th sub-jobs by using the job execution device does not exceed the occupiable time.

3. The job distribution processing system according to claim 2, wherein
the setting unit sets the occupiable time according to a time when the job is executed.

4. The job distribution processing system according to claim 1, wherein the execution destination determining device includes a determination unit that determines whether there is an available capacity in the job execution device for executing the sub-job other than the N-th sub-job in accordance with a processing capability of the job execution device based on the current use status of the job execution device and based on a resource of the job execution device required for executing the job, and the execution destination determining device determines the execution destination of the sub-job using the calculation unit and the specifying unit in a case where the determination unit determines that there is the available capacity in the job execution device.

5. The job distribution processing system according to claim 1, wherein the execution destination determining device includes a determination unit that determines whether there is an available capacity in the job execution device for executing the sub-job other than the N-th sub-job in accordance with the processing capability of the job execution device based on the current use status of the job execution device and based on a resource of the job execution device required for executing the job, and the execution destination determining device determines the sub-job replacement device, which is assigned by the sub-job assigning unit, as the execution destination of the first to (N−1)-th sub-jobs, and determines the job execution device as the execution destination of the N-th sub-job in a case where the determination unit determines that there is no available capacity in the job execution device.

6. An information processing device comprising:
a processor;
a job accepting unit that accepts an execution request of a job;
a division unit that divides the accepted job into N sub-jobs; wherein N is an integer equal to or greater than three,
a sub-job execution unit that is designated as a job execution requesting destination and that executes at least a sub-job which is executed N-th as the last sub-job out of N sub-jobs;
a first acquiring unit that acquires replacement device capability information relating to a processing capability of one or a plurality of sub-job replacement devices which execute a sub-job other than the sub-job executed by the sub-job execution unit instead of the sub-job execution unit;
a sub-job assigning unit that assigns the sub-jobs which are performed first to (N−1)-th to the sub-job replacement devices which are planned to execute the first to (N−1)-th sub-jobs by referring to the replacement device capability information;
a second acquiring unit that acquires information relating to a current use status of the information processing device;
a third acquiring unit that acquires information relating to data transmission between the information processing device and the sub-job replacement device;
a calculation unit that calculates a first processing time and a second processing time, while sequentially decreasing a value of a variable i from N based on the replacement device capability information, the information relating to the current use status of the sub-job execution unit, and the information relating to data transmission between the sub-job execution unit and the sub-job replacement devices,
wherein i is a positive integer, the first processing time is calculated by adding a first execution time at a time when a (i−1)-th sub-job is executed by the sub-job replacement device assigned by the sub-job assigning unit and a first transmission time required for transmitting data of an execution result of the (i−1)-th sub-job from the sub-job replacement device to the sub-job execution unit, and the second processing time is calculated by adding a second execution time at a time when the (i−1)-th sub-job is executed by the sub-job execution unit and a second transmission time required for transmitting data of an execution result at a time when a (i−2)-th sub-job is executed by the sub-job replacement device which is assigned by the sub-job assigning unit from the sub-job replacement device to the sub-job execution unit, a specifying unit that specifies one variable i when the first processing time is shorter than the second processing time primarily in the case that a value of a variable i is sequentially decreased from N, as a result of comparing the first processing time with the second processing time which are calculated by the calculation unit; and a determination unit that determines the sub-job replacement devices, which are assigned by the sub-job assigning unit, as the execution destinations of the first to (i−1)-th sub-jobs, and that determines the sub-job execution unit as the execution destinations of the i-th to N-th sub-jobs, in accordance with the one variable i specified by the specifying unit.

7. A non-transitory computer-readable medium storing a program that causes a computer to execute an information processing, the information processing comprising:
accepting an execution request of a job;
dividing the accepted job into N sub-jobs;
wherein N is an integer equal to or greater than three,
designating a sub-job execution device which executes at least a sub-job executed N-th as the last sub-job out of N sub-jobs as a job execution requesting destination;
first acquiring replacement device capability information relating to a processing capability of one or a plurality of sub-job replacement devices which execute a sub-job other than the sub-job executed by the sub-job execution device instead of the sub-job execution device;
assigning the sub-jobs which are performed first to (N−1)-th to the sub-job replacement devices which are planned to execute the first to (N−1)-th sub-jobs by referring to the replacement device capability information;
a second acquiring information relating to a current use status of the information processing device;
a third acquiring information relating to data transmission between the sub-job execution device and the sub-job replacement device;
calculating a first processing time and a second processing time, while sequentially decreasing a value of a variable i from N based on the replacement device capability information, the information relating to the current use status of the sub-job execution device, and the information relating to data transmission between the sub-job execution unit and the sub-job replacement devices,
wherein i is a positive integer,
the first processing time is calculated by adding a first execution time at a time when a (i−1)-th sub-job is executed by the assigned sub-job replacement device and a first transmission time required for transmitting data of an execution result of the (i−1)-th sub-job from the sub-job replacement device to the sub-job execution device, and the second processing time is calculated by adding a second execution time at a time when the (i−1)-th sub-job is executed by the sub-job execution device and a second transmission time required for transmitting data of an execution result at a time when a (i−2)-th sub-job is executed by the assigned sub-job replacement device from the sub-job replacement device to the sub-job execution device, specifying one variable i when the first processing time is shorter than the second processing time primarily in the case that a value of a variable i is sequentially decreased from N, as a result of comparing the calculated first processing time with the calculated second processing time;

determining the assigned sub-job replacement devices, as the execution destinations of the first to (i−1)-th sub-jobs in accordance with the specified one variable i; and determining the sub-job execution device as the execution destinations of the i-th to N-th sub-jobs, in accordance with the specified one variable i.

* * * * *